US012523711B2

(12) United States Patent
N et al.

(10) Patent No.: US 12,523,711 B2
(45) Date of Patent: Jan. 13, 2026

(54) TRIODE FOR ALTERNATING CURRENT (TRIAC) DETECTION IN GROUND-FAULT, ARC-FAULT, AND DUAL FAULT CIRCUIT INTERRUPTERS

(71) Applicant: ABB Schweiz AG, Baden (CH)

(72) Inventors: Chandrashekar N, Hyderabad (IN); Hetul S. Patel, Waterford, CT (US)

(73) Assignee: ABB Schweiz AG, Baden (CH)

( * ) Notice: Subject to any disclaimer, the term of this patent is extended or adjusted under 35 U.S.C. 154(b) by 264 days.

(21) Appl. No.: 18/454,498

(22) Filed: Aug. 23, 2023

(65) Prior Publication Data
US 2025/0067819 A1    Feb. 27, 2025

(51) Int. Cl.
*G01R 31/54* (2020.01)
*H02H 1/00* (2006.01)
*H02H 3/02* (2006.01)

(52) U.S. Cl.
CPC ........... *G01R 31/54* (2020.01); *H02H 1/0007* (2013.01); *H02H 3/021* (2013.01)

(58) Field of Classification Search
CPC ....... G01R 31/54; H02H 3/021; H02H 1/0007
See application file for complete search history.

(56) References Cited

U.S. PATENT DOCUMENTS 8,085,516 B1    12/2011   Armstrong
11,112,453 B2    9/2021   Ostrovsky et al.

FOREIGN PATENT DOCUMENTS

AU    2015400027 A1 * 11/2017    ......... A47L 15/0049

\* cited by examiner

*Primary Examiner* — Minh Q Phan
(74) *Attorney, Agent, or Firm* — Fitch Even Tabin & Flannery LLP (57) ABSTRACT

A method for controlling a triode for alternating current (TRIAC), applied to a device, is provided. A voltage is connected to an anode of the TRIAC, and a scaled down voltage is fed into an analog-to-digital converter (ADC) pin of the device. The method includes (1) tracking the voltage at the anode of the TRIAC; (2) applying a trigger pulse to a gate of the TRIAC for a preset time based on the voltage at the anode of the TRIAC reaching a threshold; and (3) detecting whether there is a dip that corresponds to the preset time in the scaled down voltage at the ADC pin of the device. The method further includes, in response to not detecting a dip corresponding to the preset time in the scaled down voltage at the ADC pin, (4) waiting an amount of time; and (5) repeating the steps (1)-(3).

20 Claims, 8 Drawing Sheets

TRIODE FOR ALTERNATING CURRENT (TRIAC) DETECTION IN GROUND-FAULT, ARC-FAULT, AND DUAL FAULT CIRCUIT INTERRUPTERS

FIELD

Generally, the present disclosure relates to detection of a triode for alternating current (TRIAC) and, more specifically, to a method and device for detecting a TRIAC for ground-fault (GF), arc-fault (AF), and dual fault (DF) circuit interrupters.

BACKGROUND

A triode for alternating current (TRIAC) is an electronic component that is commonly used for controlling alternating current (AC) circuits, such as a switch. One application of a TRIAC is in a circuit interrupter that protects electrical wiring by detecting a fault and interrupting current flow. For example, a circuit interrupter, which is widely applied for industrial and civil uses, may be a ground-fault (GF), an arc-fault (AF), or a dual fault (DF) circuit interrupter. In general, a TRIAC triggers an actuator or a solenoid in a GF, an AF, or a DF circuit interrupter. Because a TRIAC can be triggered into conduction in both directions by positive or negative polarity gate pulses, voltages across a TRIAC need to be constantly observed and controlled to ensure proper functioning of a TRIAC in a GF, an AF, or a DF circuit interrupter. The traditional approach is to build an additional circuit, known as a snubber circuit, across a TRIAC to reduce the voltage slew rate and avoid unintended triggers.

Therefore, there is a need to simplify the structure of a TRIAC detection for ground-fault (GF), arc-fault (AF), and dual fault (DF) circuit interrupters, to ensure its proper functions, and to perform more effectively.

SUMMARY

In an exemplary embodiment, the present disclosure provides a method for controlling a triode for alternating current (TRIAC) that is applied to a device. A voltage is connected to an anode of the TRIAC, and a scaled down voltage is fed into an analog-to-digital converter (ADC) pin of the device. The method includes:

(1) tracking the voltage at the anode of the TRIAC; (2) applying a trigger pulse to a gate of the TRIAC for a preset time based on the voltage at the anode of the TRIAC reaching a threshold; and (3) detecting whether there is a dip that corresponds to the preset time in the scaled down voltage at the ADC pin of the device.

The method further includes: in response to not detecting a dip that corresponds to the preset time in the scaled down voltage at the ADC pin of the device, (4) waiting an amount of time; and (5) repeating the steps (1)-(3). The method further includes: repeating the steps (4) and (5) based on a dip that corresponds to the preset time in the scaled down voltage at the ADC pin of the device not being detected. The steps (4) and (5) are repeated a predetermined number of times, and after steps (4) and (5) are repeated the predetermined number of times, the method further includes indicating that the TRIAC is not operational.

The voltage is a rectified voltage or an alternating current (AC) mains voltage. The rectified voltage is connected to the anode of the TRIAC in 2 Pole condition and the AC mains voltage is connected to the anode of the TRIAC in 1 Pole condition.

The preset time ensures that the scaled down voltage can be sensed at the ADC pin of the device.

The threshold is 13 Volt.

The TRIAC being not operational includes at least one of that the TRIAC is open circuited and the TRIAC is missing.

In another exemplary embodiment, the present disclosure provides a device for controlling a triode for alternating current (TRIAC). A voltage is connected to an anode of the TRIAC, and a scaled down voltage is fed into an analog-to-digital converter (ADC) pin of the device. The device is configured to:

(1) track the voltage at the anode of the TRIAC; (2) apply a trigger pulse to a gate of the TRIAC for a preset time based on the voltage at the anode of the TRIAC reaching a threshold; and (3) detect whether there is a dip that corresponds to the preset time in the scaled down voltage at the ADC pin of the device.

The device is further configured to: in response to not detecting a dip that corresponds to the preset time in the scaled down voltage at the ADC pin of the device, (4) wait an amount of time; and (5) repeat the steps (1)-(3). The device is further configured to: repeat the steps (4) and (5) based on a dip that corresponds to the preset time in the scaled down voltage at the ADC pin of the device not being detected. The steps (4) and (5) are repeated a predetermined number of times, and after steps (4) and (5) are repeated the predetermined number of times, the device is further configured to indicate that the TRIAC is not operational.

In another exemplary embodiment, the present disclosure provides a non-transitory computer-readable medium, having computer-executable instructions stored thereon, the computer-executable instructions, when executed by one or more processors of a device for controlling a triode for alternating current (TRIAC), cause the device to facilitate the following steps. A voltage is connected to an anode of the TRIAC, and a scaled down voltage is fed into an analog-to-digital converter (ADC) pin of the device.

(1) tracking the voltage at the anode of the TRIAC; (2) applying a trigger pulse to a gate of the TRIAC for a preset time based on the voltage at the anode of the TRIAC reaching a threshold; and (3) detecting whether there is a dip that corresponds to the preset time in the scaled down voltage at the ADC pin of the device.

The device is caused to further facilitate: in response to not detecting a dip that corresponds to the preset time in the scaled down voltage at the ADC pin of the device, (4) waiting an amount of time; and (5) repeating the steps (1)-(3). The device is caused to further facilitate: repeating the steps (4) and (5) based on a dip that corresponds to the preset time in the scaled down voltage at the ADC pin of the device not being detected. The steps (4) and (5) are repeated a predetermined number of times, and after steps (4) and (5) are repeated the predetermined number of times, the device is caused to further facilitate indicating that the TRIAC is not operational.

DETAILED DESCRIPTION

Exemplary embodiments of the present disclosure provide a method, device, and non-transitory computer-readable medium for controlling a triode for alternating current (TRIAC).

A TRIAC and a silicon controlled rectifier (SCR) both function as semiconductor switching devices. While a TRIAC can be triggered in conduction in both directions, an SCR can only conduct current in one direction. When applying these two types of semiconductor switching devices, detecting of the TRIAC or the SCR is carefully performed to ensure its respective proper functioning. For example, for an SCR detection, alternating current (AC) mains are used to connect to an SCR anode.

With the rise of popularity of TRIACs, TRIACs are used more and more as switches to control high voltage devices, for example, motors, because of their bi-directional conduction, smaller size, and/or less noise. A detection of a TRIAC is usually conducted through a snubber circuit, which requires a series combination of capacitors and resistors in parallel with the TRIAC, across the TRIAC. This adds to the complexity of a circuitry structure.

Exemplary embodiments of the present disclosure provide a circuitry design for detecting a TRIAC. For example, the TRIAC may trigger an actuator or a solenoid in a GF, an AF, or a DF circuit interrupter. A rectified voltage is connected to an anode of the TRIAC. The rectified voltage is scaled down through a voltage divider, and then fed into an analog-to-digital converter (ADC) pin of a microcontroller. The microcontroller tracks the anode voltage of the TRIAC, i.e., the rectified voltage, and looks for a particular voltage level that is near zero cross. If the anode voltage of the TRIAC is low and near zero cross, the microcontroller applies a trigger pulse to a gate of the TRIAC for a very short time. Accordingly, the TRIAC is latched on for a very short time, and there will be a dip in a voltage at the ADC pin of the microcontroller. This dip is observed at the ADC pin of the microcontroller. By observing the dip, or trying to detect dips for several different times, the microcontroller is able to understand and then indicate whether the TRIAC is connected and/or operational, or open and/or missing.

This circuitry design for detecting a TRIAC that triggers an actuator or a solenoid in a GF, an AF, or a DF circuit interrupter eliminates the need for a snubber circuit across the TRIAC. Further, a rectified voltage output of a bridge rectifier is used in 2 Pole condition and fed into the anode of the TRIAC. As such, negative half cycles of AC mains are also used for the TRIAC detection, which is not possible with an SCR. Furthermore, this circuitry design for using the TRIAC can be extended and generalized to any semiconductor switch.

Figure 1:
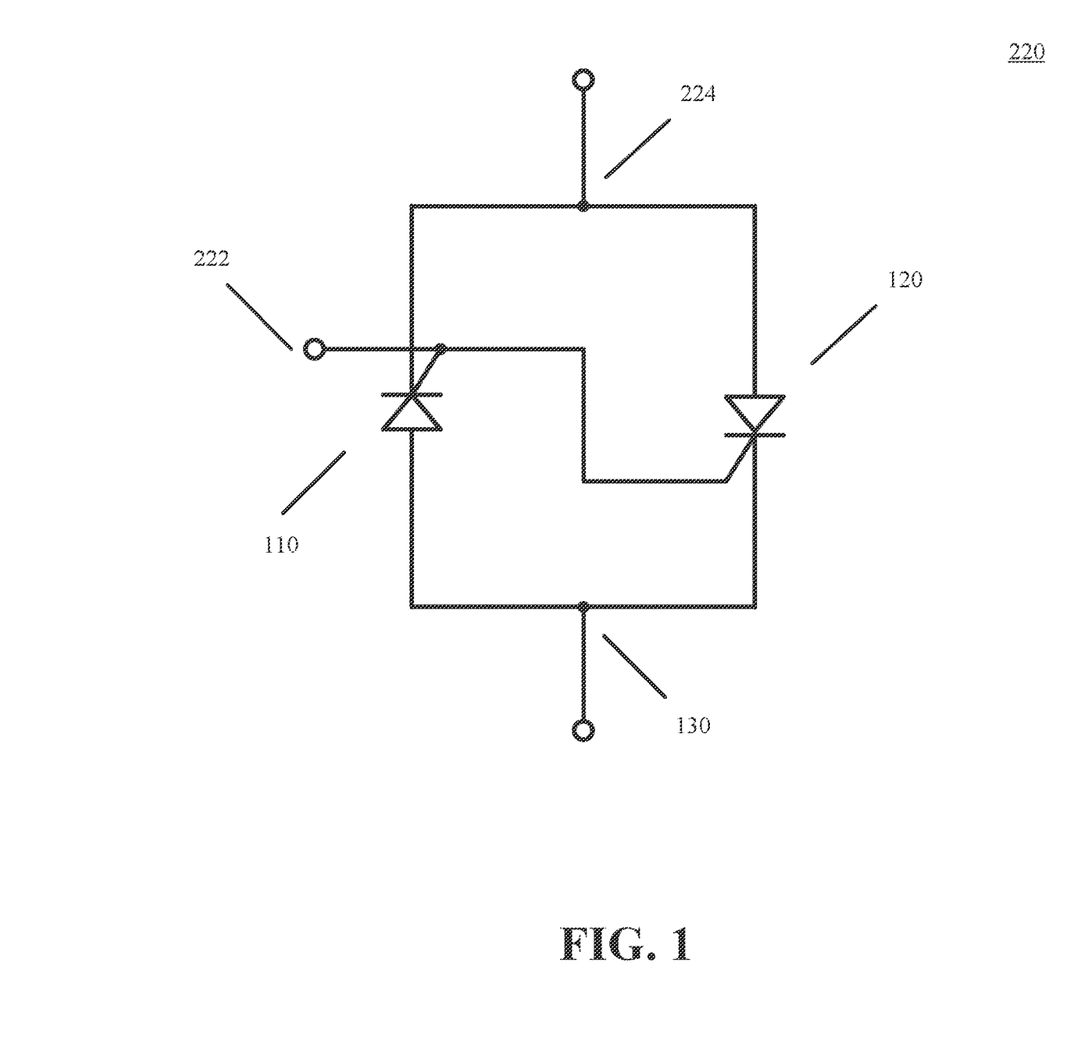
FIG. 1 is a schematic diagram of a triode for alternating current (TRIAC) that triggers an actuator or a solenoid in a ground-fault (GF), an arc-fault (AF), or a dual fault (DF) circuit interrupter according to an exemplary embodiment of the present disclosure.

FIG. 1 is a schematic diagram of a triode for alternating current (TRIAC) that triggers an actuator or a solenoid in a ground-fault (GF), an arc-fault (AF), or a dual fault (DF) circuit interrupter according to an exemplary embodiment of the present disclosure.

As shown, a TRIAC 220 includes two thyristors 110 and 120 that are connected in inverse parallel. This connection manner allows these two thyristors 110 and 120 to share a common gate 222, i.e., the gate 222 of the TRIAC 220. As shown, the main power terminals of each of the thyristors 110 and 120 are now identified as an anode 224 and a cathode 130 of the TRIAC 220, also known as AC mains.

With the arrangement described above, the TRIAC 220 is able to conduct in both directions of a sinusoidal waveform, for example, AC main power (AC mains), or AC voltage of the TRIAC 220. A TRIAC, such as the TRIAC 220 shown in FIG. 1, is widely used as a semiconductor switch, for example, a switch that triggers an actuator or a solenoid in a GF, an AF, or a DF circuit interrupter.

Figure 2:
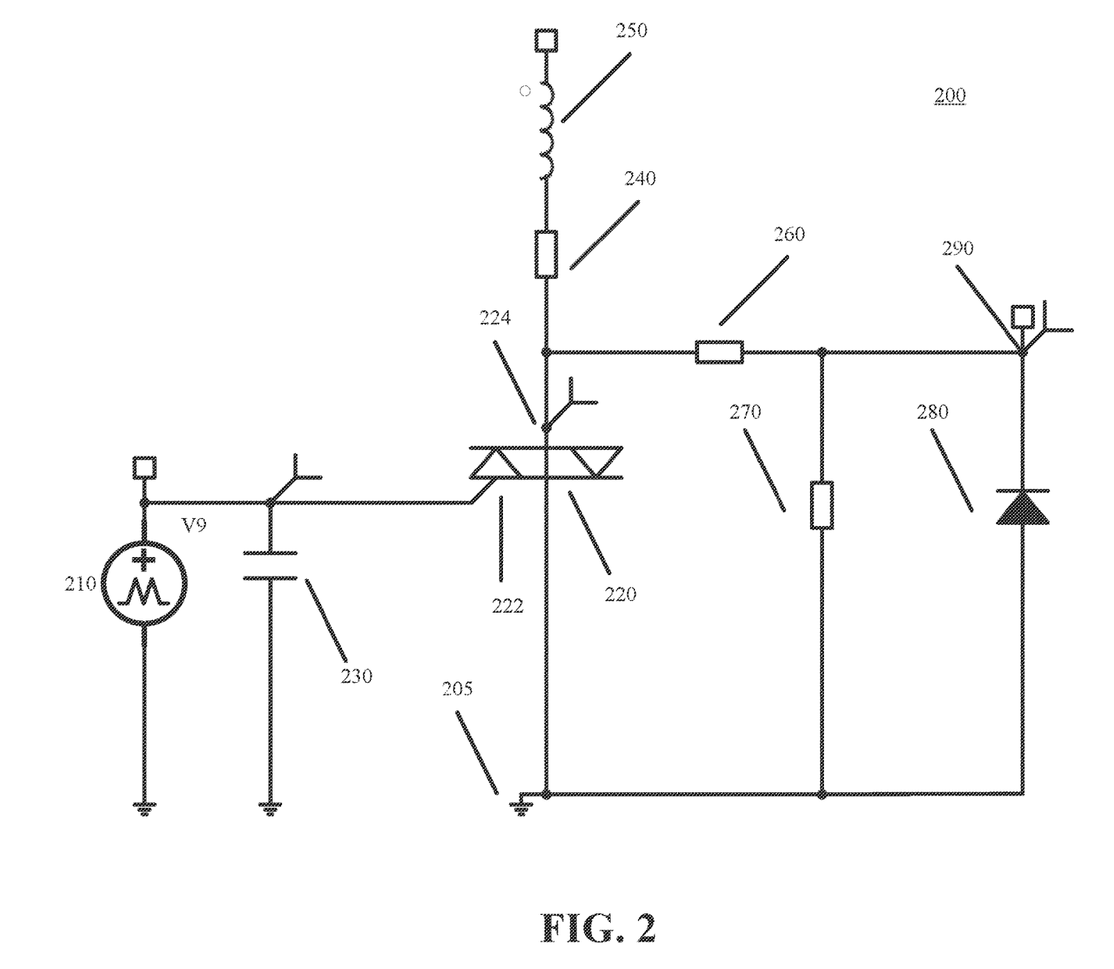
FIG. 2 is a schematic diagram of a circuit for observing and controlling a TRIAC that triggers an actuator or a solenoid in a GF, an AF, or a DF circuit interrupter according to an exemplary embodiment of the present disclosure.

FIG. 2 is a schematic diagram of a circuit for observing and controlling a TRIAC that triggers an actuator or a solenoid in a GF, an AF, or a DF circuit interrupter according to an exemplary embodiment of the present disclosure.

As shown in FIG. 2, the circuit 200 for observing and controlling the TRIAC includes a microcontroller 210 and a TRIAC 220. A capacitor 230 connected in parallel with the microcontroller 210 may have a value of 220 nF. Additionally and/or alternatively, other values of a capacitor may be used. The voltage V9 from the microcontroller 210 represents a trigger pulse for the TRIAC 220. The microcontroller 210 applies the trigger pulse represented by the voltage V9 to a gate 222 of the TRIAC 220 upon a condition being fulfilled. Various models or types of a microcontroller and/or a TRIAC may be used. Generally, a TRIAC voltage is rated above an AC mains voltage, and a microcontroller pin sources a required amount of gate current to trigger the TRIAC.

A series combination of an inductor 250 and a resistor 240 represents a solenoid of the circuit 200. The solenoid, an electro-mechanical component, is triggered by the TRIAC during a trip action. For example, the solenoid pushes a trip mechanism of the circuit 200 when being triggered. This trip mechanism in turn opens breaker contacts of a breaker for the circuit 200. One end of this solenoid is connected to an output of a bridge rectifier, and the other end of this solenoid is connected to an anode 224 of the TRIAC 220. As such, a rectified voltage from the output of the bridge rectifier is safely fed into the anode 224 of the TRIAC 220. A value of the inductor 250 may be 1 µH. A value of the resistor 240 may be 60 Ohm. A tolerance rate of the resistor 240 may be 5%. Additionally and/or alternatively, other values and/or tolerance rates of the inductor 250 and/or the resistor 240 may be also used. For example, these values are determined based on the solenoid construction and a plunger force required to trigger the breaker for the circuit 200.

For example, a condition for the microcontroller 210 to apply the trigger pulse represented by the voltage V9 to the gate 222 of the TRIAC 220 may be that a voltage at the anode 224 of the TRIAC 220 is sufficiently low. For example, the voltage at the anode 224 of the TRIAC 220 may be near zero cross. Or, a threshold may be provided for the voltage at the anode 224 of the TRIAC 220. For example, a threshold may be 13 Volt. Additionally and/or alternatively, other values also may be used for the threshold. In general, firmware of the microcontroller 210 tracks the voltage at the anode 224 of the TRIAC 220 and looks for a particular voltage level that is near zero cross, i.e., the threshold. Once the threshold is reached, the microcontroller 210 applies the trigger pulse to the gate 222 of the TRIAC 220.

As shown, the other end of the solenoid that is connected to the anode 224 of the TRIAC 220 is also connected to a voltage divider. The voltage divider may be a resistive divider that is created by two resistors 260 and 270 connected in series. The rectified voltage from the bridge rectifier is fed across the series resistors 260 and 270, and then, a scaled down rectified voltage is able to be fed to an ADC pin 290 of the microcontroller 210. For example, an output voltage at the ADC pin 290 of the microcontroller 210 is a fraction of the rectified voltage. A value of the resistor 260 may be 91000 Ohm. A tolerance rate of the resistor 260 may be 5%. A value of the resistor 270 may be 1500 Ohm. Additionally and/or alternatively, other values and/or tolerance rates of the resistor 260 and/or the resistor 270 may be also used. As also shown, a diode 280 is connected in series with the ADC pin of the microcontroller 210. Various types and/or values of a diode may be used.

The ADC pin 290 of the microcontroller 210 serves as a node for detecting the solenoid of the circuit 200. For example, if there is a dip in the voltage at the ADC pin 290 of the microcontroller 210, this dip can be observed at the ADC pin 290 of the microcontroller 210. As introduced above, the microcontroller 210 closely tracks the voltage at the anode 224 of the TRIAC 220, and applies a trigger pulse to the gate 222 of the TRIAC 220 if the voltage is below the threshold. For example, the microcontroller 210 applies the trigger pulse for a short time, and the TRIAC 220 is latched on for a corresponding short time upon the trigger pulse. Accordingly, the voltage at the anode 224 of the TRIAC 220 goes to the Ground 205 for a corresponding short time upon the trigger pulse, as such, a dip appears in the voltage at the anode 224 of the TRIAC 220. In a similar manner, there is also a dip in the scaled down rectified voltage at the ADC pin 290 of the microcontroller 210 for a corresponding short time upon the trigger pulse. The microcontroller 210 is able to observe this ADC pin voltage dip through its ADC pin 290, for example, in a format of a voltage plot.

In this scenario, the microcontroller 210 understands that the TRIAC 220 is connected and operating properly. The microcontroller 210 continues operating as usual.

If the microcontroller 210 is not able to observe an ADC pin voltage dip at its ADC pin 290 after detecting a voltage below the threshold at the anode 224 of the TRIAC 220 and applying a trigger pulse to the gate 222 of the TRIAC 220, the microcontroller 210 understands that the TRIAC 220 may be open or missing. In this scenario, the microcontroller 210 repeats the process for checking the status of the TRIAC 220. For example, the microcontroller 210 first waits for a certain amount of time, for example, for one second. The microcontroller 210 then applies another trigger pulse to the gate 222 of the TRIAC 220 for a short time when the voltage at the anode 224 of the TRIAC 220 reaches the threshold again. The microcontroller 210 then checks at its ADC pin 290 regarding whether there is a momentary dip that corresponds to the short time in the scaled down rectified voltage at the microcontroller ADC pin 290.

In an exemplary embodiment of the present disclosure, this process repeats for a predetermined number of times, for example, three consecutive times. If during any of these three consecutive times, the microcontroller 210 is able to observe a momentary ADC pin voltage dip at its ADC pin 290, it stops the process. If after these three consecutive times, the microcontroller 210 is still not able to observe a momentary ADC pin voltage dip at its ADC pin 290, it stops the process and indicates that there is a failure with the TRIAC 220 through a light-emitter diode (LED). Such a failure could be that the TRIAC 220 is open-circuited, or the TRIAC 220 is missing. Other situations with the TRIAC 220 may also cause such a failure.

As such, a detection of a TRIAC based on a corresponding circuitry design is completed. Instead of using alternating current (AC) line voltage, a rectified voltage output is fed to an anode of a TRIAC. Moreover, positive and negative half cycles offered by the AC line voltage, i.e., AC mains, are used. For example, this would make a negative half cycle of AC mains also be used for a detection of a TRIAC, which eliminates the need of a rectifier diode. Further, because the detection is on a TRIAC rather than only on a silicon controlled rectifier (SCR), the detection method and according circuitry design introduced herein provide much wider usage. Basically, a TRIAC can be extended and generalized to any semiconductor switch.

Figure 3:
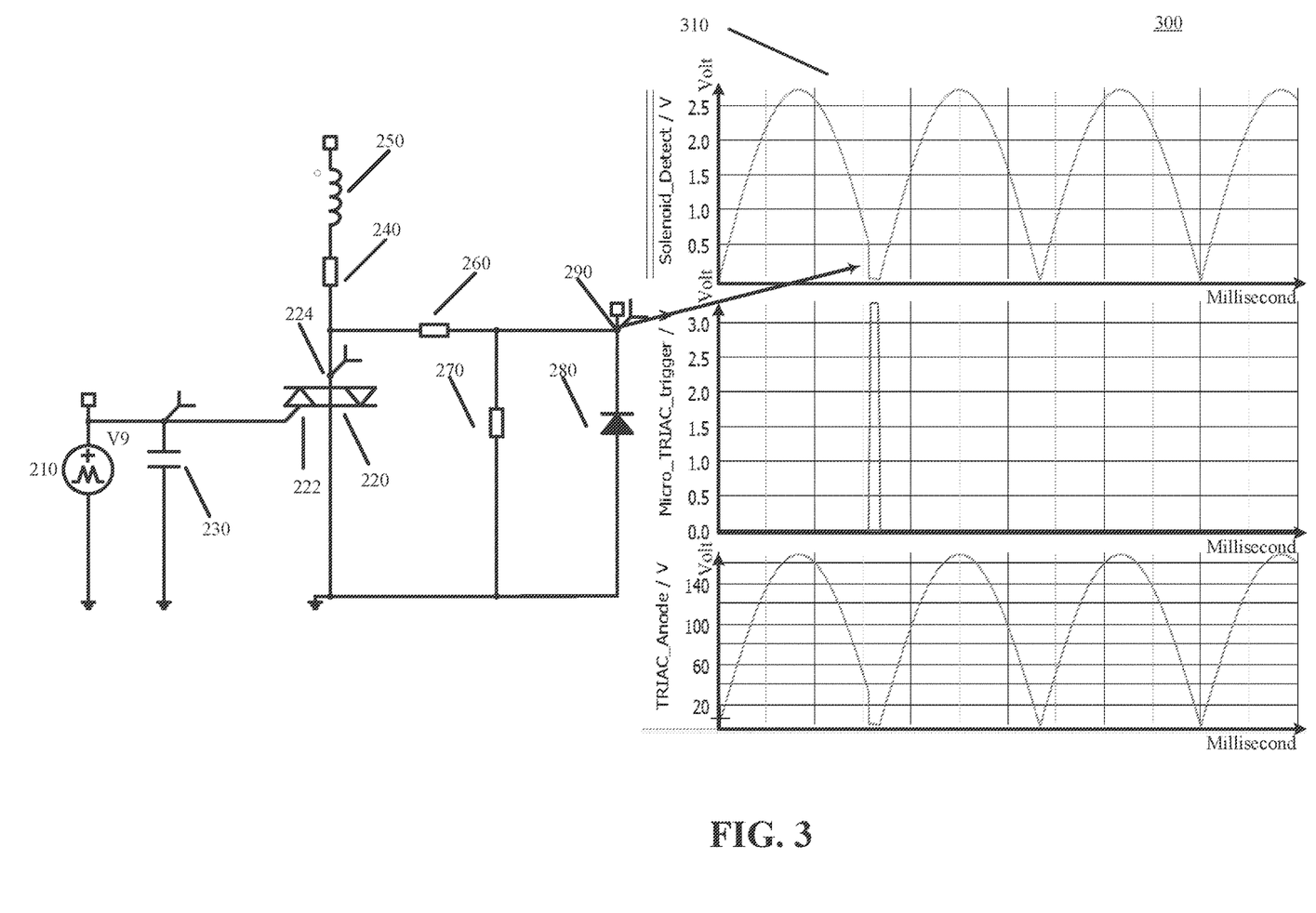
FIG. 3 is a schematic plot of voltages of a node for detecting the solenoid (solenoid_detect) of the circuit of FIG. 2 according to an exemplary embodiment of the present disclosure.

FIG. 3 is a schematic plot of voltages of a node for detecting the solenoid (solenoid_detect) of the circuit of FIG. 2 according to an exemplary embodiment of the present disclosure.

As described with reference to FIG. 2, the ADC pin 290 of the microcontroller 210 serves as a node for detecting the solenoid of the circuit 200. As shown in FIG. 3, the voltage plot represented by 310 at the ADC pin 290 of the microcontroller 210 has a momentary dip in one positive sinusoidal AC voltage. This dip is observed by the microcontroller 210 at its ADC pin 290 when the microcontroller 210 detects the voltage at the TRIAC anode 224 is near zero cross and then applies a trigger pulse to the TRIAC gate 222. With this voltage dip, the microcontroller 210 understands that the TRIAC 220 of the circuit 200 is connected and/or operational. The microcontroller 210 then continues operating as usual based on such information.

Figure 4:
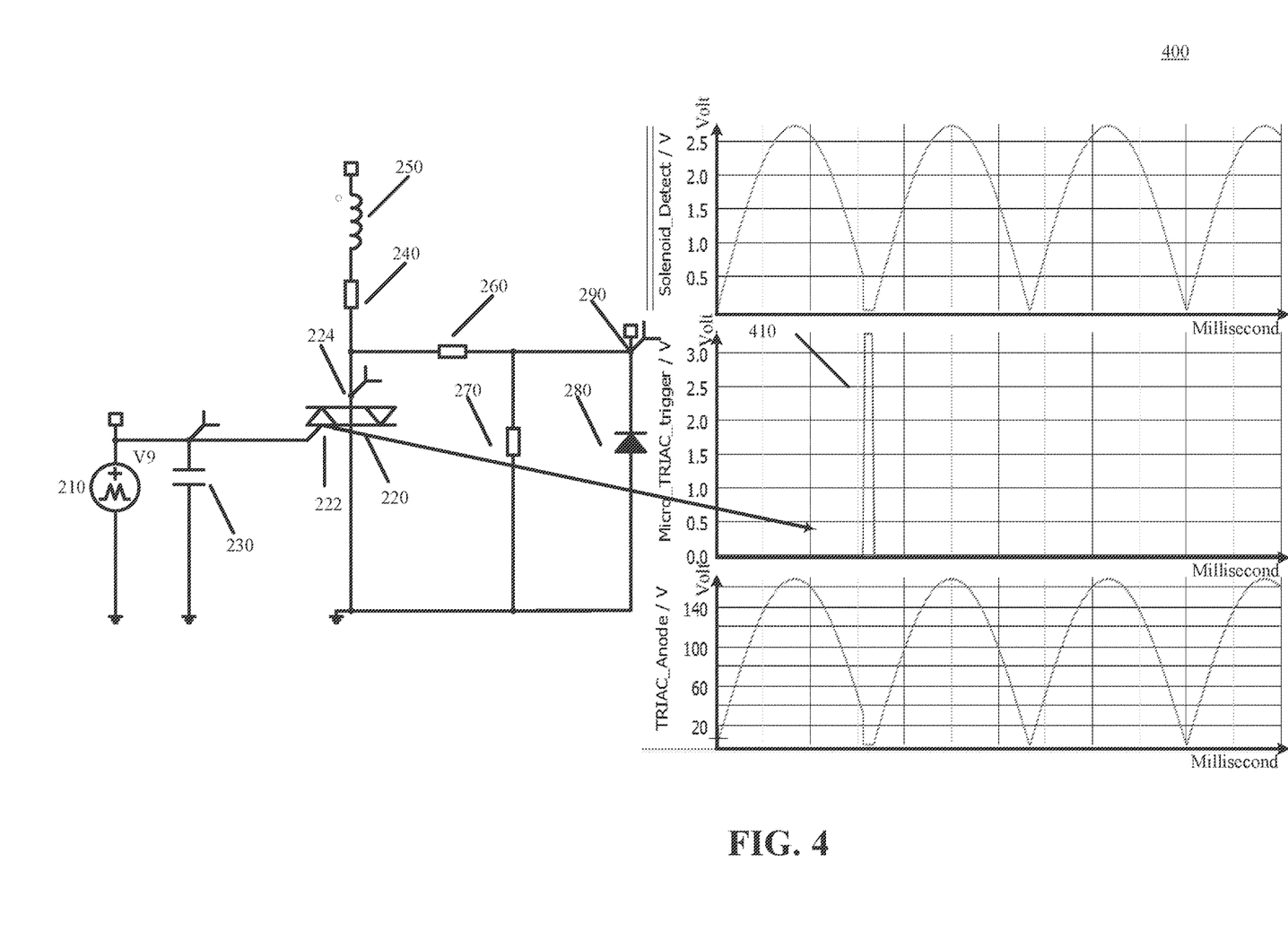
FIG. 4 is a schematic plot of voltages of a microcontroller trigger for the TRIAC (micro_TRIAC_trigger) of the circuit of FIG. 2 according to an exemplary embodiment of the present disclosure.

FIG. 4 is a schematic plot of voltages of a microcontroller trigger for the TRIAC (micro_TRIAC_trigger) of the circuit of FIG. 2 according to an exemplary embodiment of the present disclosure.

As described with reference to FIG. 2, a voltage V9 from the microcontroller 210 represents a trigger pulse for the TRIAC 220. The microcontroller 210 applies the trigger pulse represented by the voltage V9 to a gate 222 of the TRIAC 220. As shown in FIG. 4, the voltage represented by 410, namely the trigger pulse, is applied by the microcontroller 210 to the TRIAC gate 222 for a short time when the microcontroller 210 detects the voltage at the TRIAC anode 224 is near zero cross.

Figure 5:
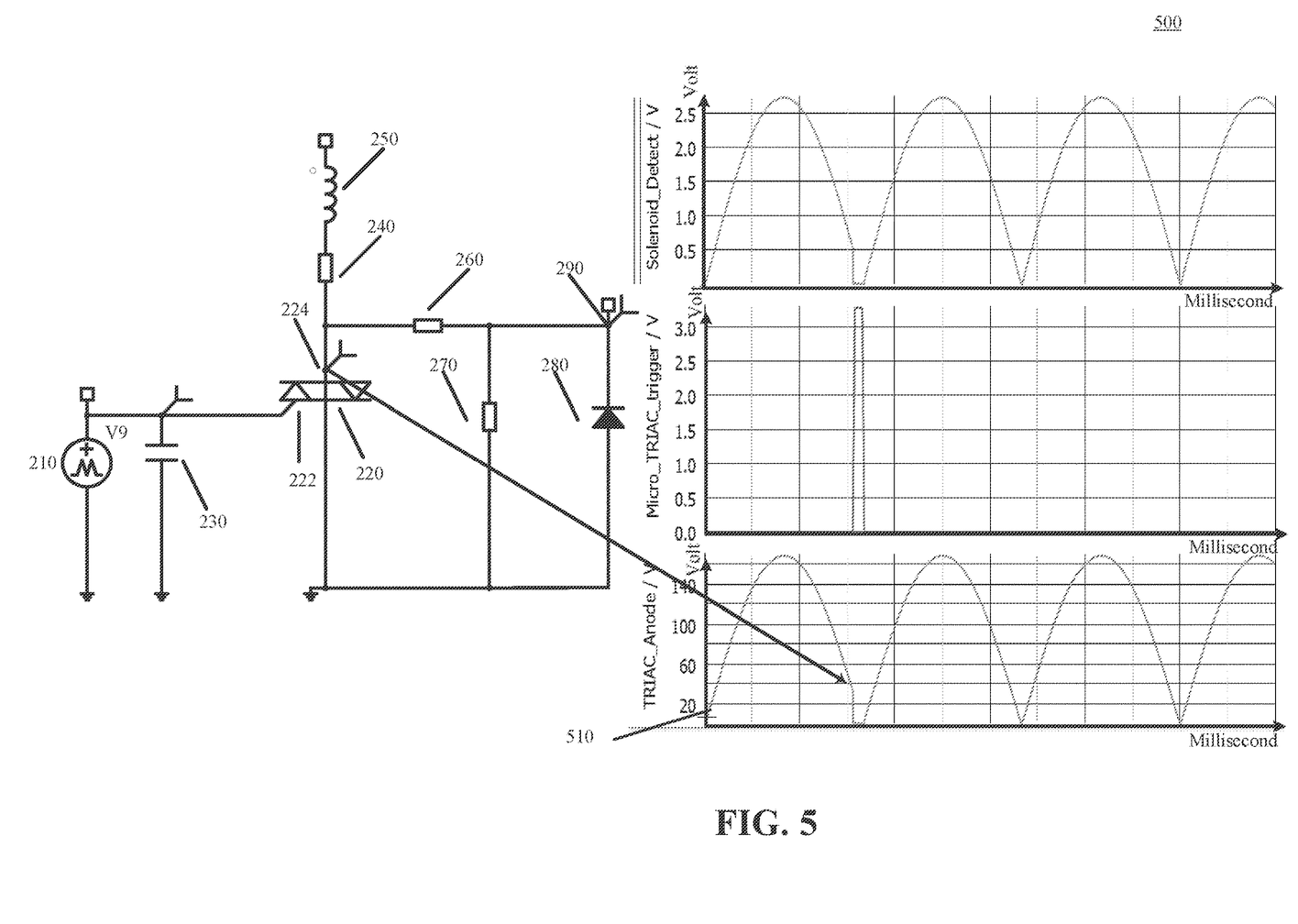
FIG. 5 is a schematic plot of voltages of an anode of the TRIAC (TRIAC-anode) of the circuit of FIG. 2 according to an exemplary embodiment of the present disclosure.

FIG. 5 is a schematic plot of voltages of an anode of the TRIAC (TRIAC-anode) of the circuit of FIG. 2 according to an exemplary embodiment of the present disclosure.

As described with reference to FIG. 2, a rectified voltage from an output of a bridge rectifier is fed into the anode 224 of the TRIAC 220 of the circuit 200. As shown in FIG. 5, the voltage represented by 510 at the TRIAC anode 224 has a momentary dip in one positive sinusoidal AC voltage. This happens when the microcontroller detects the voltage at the TRIAC anode 224 is lower than a threshold, and then applies a trigger pulse to the TRIAC gate 222 for a short time. This trigger pulse causes the TRIAC 220 to be latched on for a short time, during which the voltage at the TRIAC anode 224 points to the Ground 205. As such, the momentary dip appears in one positive sinusoidal AC voltage at the TRIAC anode 224.

As also shown in the schematic plots of FIGS. 3-5, the time periods, during which the dip in one positive sinusoidal AC voltage at the microcontroller ADC pin 290, the trigger pulse at the TRIAC gate 222, and the dip in one positive sinusoidal AC voltage at the TRIAC anode 224 are detected or applied, correspond to each other. This performance is in line with the circuitry design described above.

Figure 6:
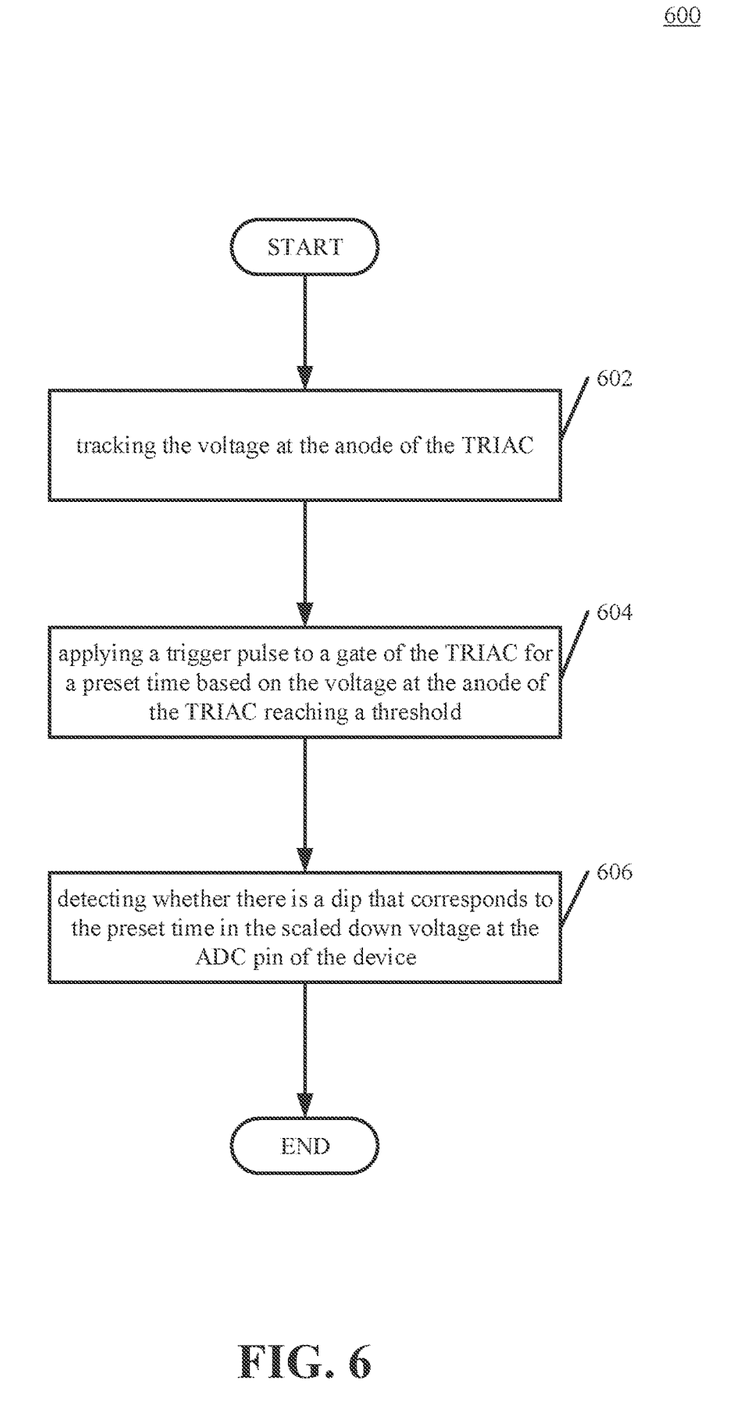
FIG. 6 is a schematic flowchart of a method for observing and controlling a TRIAC that triggers an actuator or a solenoid in a GF, an AF, or a DF circuit interrupter according to an exemplary embodiment of the present disclosure.

FIG. 6 is a schematic flowchart of a method for observing and controlling a TRIAC that triggers an actuator or a solenoid in a GF, an AF, or a DF circuit interrupter according to an exemplary embodiment of the present disclosure.

According to the circuitry design described with reference to FIG. 2, the microcontroller 210 observes the TRIAC 220 through a rectified voltage from a bridge rectifier that is connected to an anode 224 of the TRIAC 220. A scaled down rectified voltage is fed into an ADC pin 290 of the microcontroller 210. The microcontroller 210 controls the TRIAC 220 through a trigger pulse based on the rectified voltage at the TRIAC anode 224. The microcontroller 210 provides an indication of status of the TRIAC 220 based on the scaled down rectified voltage at the microcontroller ADC pin 290.

As shown in FIG. 6, the method for observing and controlling a TRIAC that triggers an actuator or a solenoid in a GF, an AF, or a DF circuit interrupter includes:

At 602, the voltage at the anode of the TRIAC is tracked.

The voltage may be a rectified voltage or an AC mains voltage.

In an exemplary embodiment of the present disclosure, the rectified voltage is an output of a bridge rectifier in 2 Pole condition. This makes use of positive and negative half cycles of the TRIAC possible. The rectified voltage output is fed to an inductor and a resistor connected in series before being safely connected to the anode of the TRIAC. That is, AC mains is directly connected to the TRIAC node through the solenoid to make the TRIAC conduct in both positive and negative half cycles.

At 604, a trigger pulse to a gate of the TRIAC is applied for a preset time based on the voltage at the anode of the TRIAC reaching a threshold.

In an exemplary embodiment of the present disclosure, the threshold is 13 Volt.

At 606, whether there is a dip that corresponds to the preset time in the scaled down voltage at the ADC pin of the device/microcontroller is detected.

In an exemplary embodiment of the present disclosure, the preset time is a short time so that the TRIAC is latched on for a short time, and the voltage at the TRIAC anode goes to the Ground for a short time. Accordingly, there is a momentary dip that corresponds to the short time in the voltage at the TRIAC anode, as shown in FIG. 5. Because the voltage at the TRIAC anode now points to the Ground while the TRIAC is latched on, a momentary dip that corresponds to the short time also appears in the scaled down voltage at the microcontroller ADC pin, as shown in FIG. 3. In general, the time is preset as sufficiently short as possible so that the scaled down voltage at the microcontroller ADC pin can still be sensed.

As described above, a momentary dip that corresponds to the short time appears in the scaled down voltage at the microcontroller ADC pin, after the microcontroller applies the trigger pulse to the TRIAC gate for the short time and the TRIAC is accordingly latched on. Once this momentary dip is detected, the microcontroller understands that TRIAC is connected and operating properly, and then, the microcontroller continues operating as usual.

Figure 7:
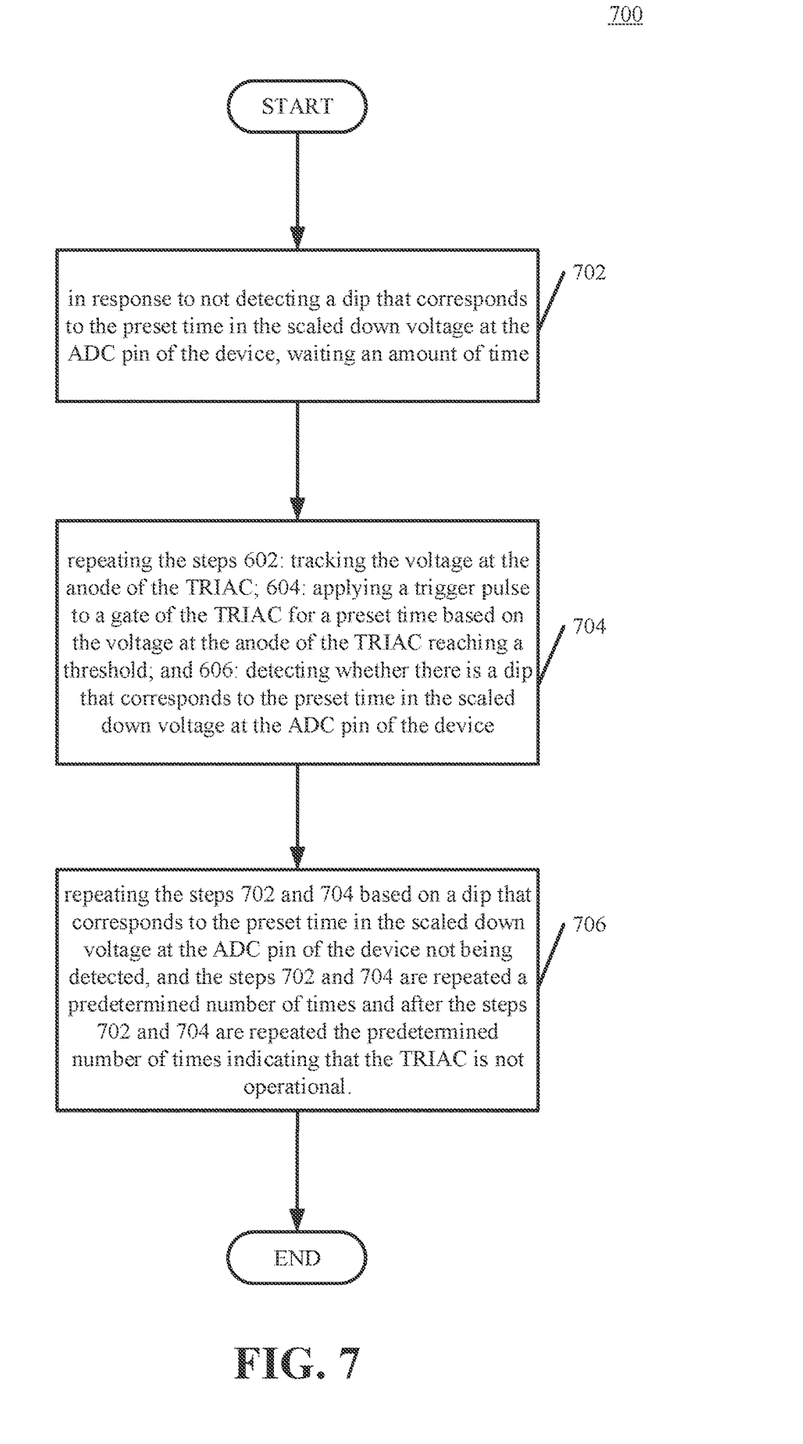
FIG. 7 is a schematic flowchart of a method for observing and controlling a TRIAC that triggers an actuator or a solenoid in a GF, an AF, or a DF circuit interrupter according to an exemplary embodiment of the present disclosure.

FIG. 7 is a schematic flowchart of a method for observing and controlling a TRIAC that triggers an actuator or a solenoid in a GF, an AF, or a DF circuit interrupter according to an exemplary embodiment of the present disclosure.

As shown in FIG. 7, the method for observing and controlling a TRIAC that triggers an actuator or a solenoid in a GF, an AF, or a DF circuit interrupter includes the following further steps:

At 702, if a dip that corresponds to the preset time in the scaled down voltage at the ADC pin of the device/microcontroller is not detected, the device/microcontroller does the following steps: first, an amount of time is waited.

At 704, the steps 602 for tracking the voltage at the anode of the TRIAC; 604 for applying a trigger pulse to a gate of the TRIAC for a preset time based on the voltage at the anode of the TRIAC reaching the threshold; and 606 for detecting whether there is a dip that corresponds to the preset time in the scaled down voltage at the ADC pin of the device/microcontroller, as shown in FIG. 6, are repeated.

The detecting process described above according to steps 602, 604, and 606 with reference to FIG. 6 will be repeated for a predetermined number of times, for example, three times, if a dip that corresponds to the short time appears in the scaled down voltage at the microcontroller ADC pin is not detected by the microcontroller. Each time, before the microcontroller starts to repeat the detecting process, that is, the steps 602, 604, and 606 of FIG. 6, it waits for a certain amount of time, for example, for one second. This helps ensure accuracy of a result of the detecting process.

At 706, the steps 702 and 704 will be repeated based on a dip that corresponds to the preset time in the scaled down voltage at the ADC pin of the device/microcontroller not being detected. The steps 702 and 704 are repeated a predetermined number of times, for example, three times. After the steps 702 and 704 are repeated the predetermined number of times, the TRIAC is indicated not operational.

If, in any of these three times, a dip that corresponds to the short time in the scaled down voltage at the microcontroller ADC pin is detected, the microcontroller stops the detecting process.

If a dip that corresponds to the short time in the scaled down voltage at the ADC pin is not detected for three consecutive times, the microcontroller stops the detecting process, and indicates the TRIAC not operational through the LED.

In an exemplary embodiment of the present disclosure, the TRIAC being not operational may include that the TRIAC is open circuited and/or the TRIAC is missing.

Figure 8:
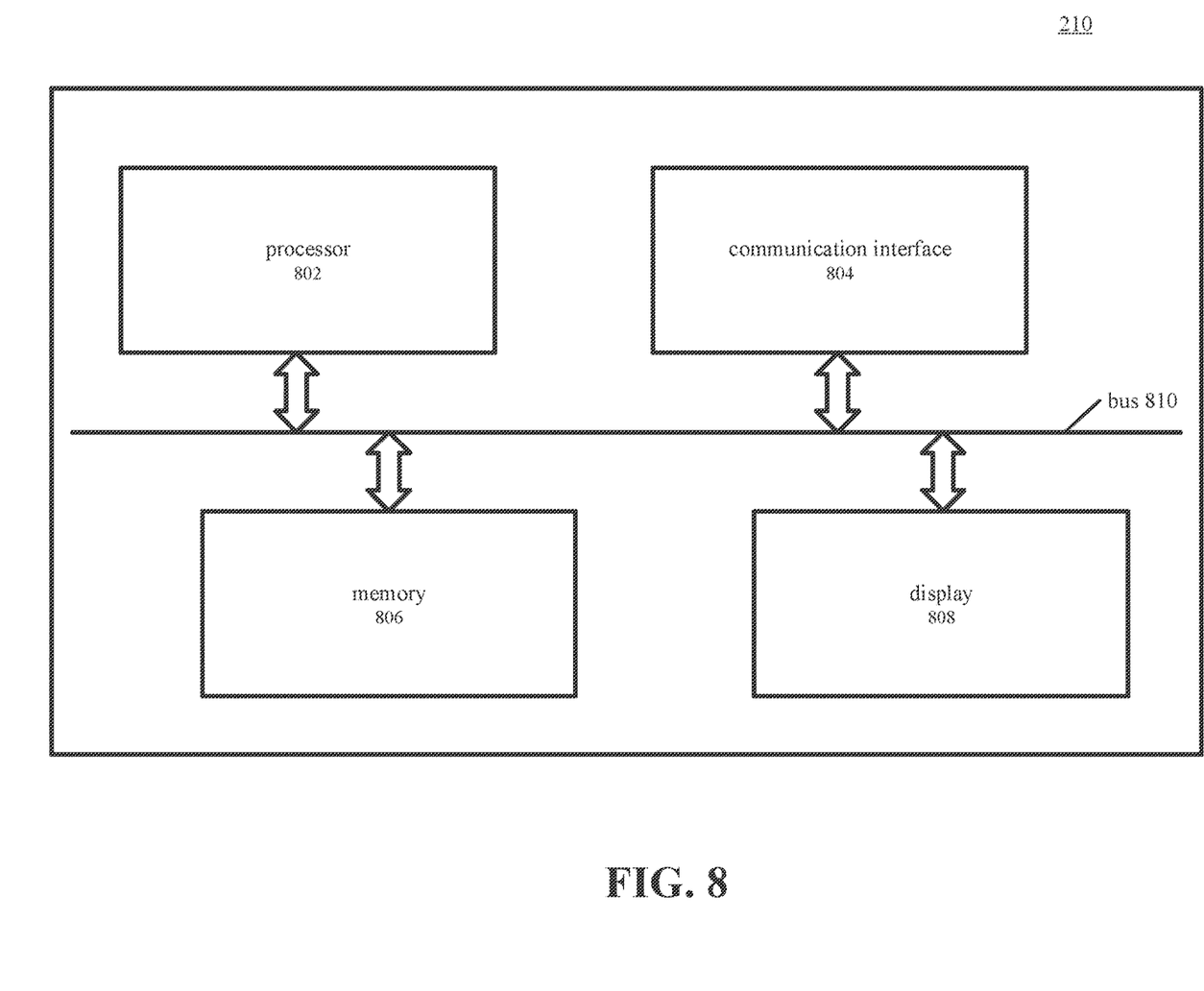
FIG. 8 is a schematic diagram of a device for observing and controlling a TRIAC that triggers an actuator or a solenoid in a GF, an AF, or a DF circuit interrupter according to an exemplary embodiment of the present disclosure.

FIG. 8 is a schematic diagram of a device for observing and controlling a TRIAC that triggers an actuator or a solenoid in a GF, an AF, or a DF circuit interrupter according to an exemplary embodiment of the present disclosure.

As shown in FIG. 8, the device 210 for observing and controlling a TRIAC may include a bus 810, a processor 802, a communication interface 804 and a memory 806. Additionally and/or alternatively, the device 210 may further include a display 808. For example, the processor 802, the communication interface 804, the memory 806 and the display 808 may communicate with each other through the bus 810.

The processor 802 may include one or more general-purpose processors, such as a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 806 may include a volatile memory, for example, a random access memory (RAM). The memory 806 may further include a non-volatile memory (NVM), for example, a read-only memory (ROM), a flash memory, a hard disk drive (HDD), or a solid-state drive (SSD). The memory 806 may further include a combination of the foregoing types.

The memory 806 may have computer-readable program codes stored thereon. The processor 802 may read the computer-readable program codes stored on the memory 806 to implement the methods 600 and/or 700 described above with reference to FIGS. 6 and 7 to detect the TRIAC that triggers an actuator or a solenoid in a GF, an AF, or a DF circuit interrupter based on the circuitry design described above with reference to FIGS. 2-5. Additionally and/or alternatively, the processor 802 may read the computer-readable program codes stored on the memory 806 to implement one or more other functions, or a combination of these functions.

The processor 802 may further communicate with another computing device through the communication interface 804. For example, the processor 802 may communicate with one or more computing devices to calculate and/or obtain how long the preset time should be for latching on the TRIAC so as to be able to observe an ADC pin voltage dip at the ADC pin of the device. For example, the processor 802 may communicate with one or more computing devices to determine how much time it should wait before repeating the detecting process in each of the predetermined number of times, for example, in each of the three consecutive times.

The processor 802 may further trigger the display 808 to display information to a user. For example, the display 808 at the ADC pin of the device shows the plots of the voltages at the TRIAC anode and the plots of the voltages at the ADC pin of the device, as shown in FIGS. 3-5. The display 808 at the ADC pin of the device also shows the trigger pulse applied to the TRIAC gate, as shown in FIGS. 3-5. For example, the processor 802 may trigger the display 808 to display the status of the TRIAC as to whether the TRIAC is connected or open-circuited. In some exemplary embodiments of the present disclosure, the display 808 is an LED that indicates the status of the TRIAC.

A person of ordinary skill in the art will appreciate that the device 210 as shown in FIG. 8 may communicate with one or more further computing devices through the communication interface 804 or wireless connections for further functions, or a combination of functions. The device 210 may also include one or more further functional components to perform and/or trigger further functions, or a combination of functions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of the present disclosure are described herein, including the best mode known to the inventors for carrying out the disclosure. Variations of those exemplary embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for controlling a triode for alternating current (TRIAC), applied to a device, wherein a voltage is connected to an anode of the TRIAC, and wherein a scaled down voltage is fed into an analog-to-digital converter (ADC) pin of the device, comprising:
    (1) tracking the voltage at the anode of the TRIAC;
    (2) applying a trigger pulse to a gate of the TRIAC for a preset time based on the voltage at the anode of the TRIAC reaching a threshold; and
    (3) detecting whether there is a dip that corresponds to the preset time in the scaled down voltage at the ADC pin of the device.

2. The method of claim 1, further comprising:
    in response to not detecting a dip that corresponds to the preset time in the scaled down voltage at the ADC pin of the device,
    (4) waiting an amount of time; and
    (5) repeating the steps (1)-(3); and
    repeating the steps (4) and (5) based on a dip that corresponds to the preset time in the scaled down voltage at the ADC pin of the device not being detected, and
    wherein the steps (4) and (5) are repeated a predetermined number of times and after steps (4) and (5) are repeated the predetermined number of times indicating that the TRIAC is not operational.

3. The method of claim 1, wherein the voltage is a rectified voltage or an alternating current (AC) mains voltage.

4. The method of claim 3, wherein the rectified voltage is connected to the anode of the TRIAC in 2 Pole condition and the AC mains voltage is connected to the anode of the TRIAC in 1 Pole condition.

5. The method of claim 1, wherein the preset time ensures that the scaled down voltage can be sensed at the ADC pin of the device.

6. The method of claim 1, wherein the threshold is 13 Volt.

7. The method of claim 2, wherein the TRIAC being not operational comprises at least one of that the TRIAC is open circuited and the TRIAC is missing.

8. A device for controlling a triode for alternating current (TRIAC), wherein a voltage is connected to an anode of the TRIAC, wherein a scaled down voltage is fed into an analog-to-digital converter (ADC) pin of the device, and wherein the device is configured to:
(1) track the voltage at the anode of the TRIAC;
(2) apply a trigger pulse to a gate of the TRIAC for a preset time based on the voltage at the anode of the TRIAC reaching a threshold; and
(3) detect whether there is a dip that corresponds to the preset time in the scaled down voltage at the ADC pin of the device.

9. The device of claim 8, further configured to:
in response to not detecting a dip that corresponds to the preset time in the scaled down voltage at the ADC pin of the device,
(4) wait an amount of time; and
(5) repeat the steps (1)-(3); and
repeat the steps (4) and (5) based on a dip that corresponds to the preset time in the scaled down voltage at the ADC pin of the device not being detected, and
wherein the steps (4) and (5) are repeated a predetermined number of times and after steps (4) and (5) are repeated the predetermined number of times indicate that the TRIAC is not operational.

10. The device of claim 8, wherein the voltage is a rectified voltage or an alternating current (AC) mains voltage.

11. The device of claim 10, wherein the rectified voltage is connected to the anode of the TRIAC in 2 Pole condition and the AC mains voltage is connected to the anode of the TRIAC in 1 Pole condition.

12. The device of claim 8, wherein the preset time ensures that the scaled down voltage can be sensed at the ADC pin of the device.

13. The device of claim 8, wherein the threshold is 13 Volt.

14. The device of claim 9, wherein the TRIAC being not operational comprises at least one of that the TRIAC is open circuited and the TRIAC is missing.

15. A non-transitory computer-readable medium, having computer-executable instructions stored thereon, the computer-executable instructions, when executed by one or more processors of a device for controlling a triode for alternating current (TRIAC), wherein a voltage is connected to an anode of the TRIAC, and wherein a scaled down voltage is fed into an analog-to-digital converter (ADC) pin of the device, cause the device to facilitate:
(1) tracking the voltage at the anode of the TRIAC;
(2) applying a trigger pulse to a gate of the TRIAC for a preset time based on the voltage at the anode of the TRIAC reaching a threshold; and
(3) detecting whether there is a dip that corresponds to the preset time in the scaled down voltage at the ADC pin of the device.

16. The non-transitory computer-readable medium of claim 15, wherein the one or more processors execute the computer-executable instructions and cause the device to further facilitate:
in response to not detecting a dip that corresponds to the preset time in the scaled down voltage at the ADC pin of the device,
(4) waiting an amount of time; and
(5) repeating the steps (1)-(3); and
repeating the steps (4) and (5) based on a dip that corresponds to the preset time in the scaled down voltage at the ADC pin of the device not being detected, and
wherein the steps (4) and (5) are repeated a predetermined number of times and after steps (4) and (5) are repeated the predetermined number of times indicating that the TRIAC is not operational.

17. The non-transitory computer-readable medium of claim 15, wherein the voltage is a rectified voltage or an alternating current (AC) mains voltage.

18. The non-transitory computer-readable medium of claim 17, wherein the rectified voltage is connected to the anode of the TRIAC in 2 Pole condition and the AC mains voltage is connected to the anode of the TRIAC in 1 Pole condition.

19. The non-transitory computer-readable medium of claim 15, wherein the preset time ensures that the scaled down voltage can be sensed at the ADC pin of the device.

20. The non-transitory computer-readable medium of claim 16, wherein the TRIAC being not operational comprises at least one of that the TRIAC is open circuited and the TRIAC is missing.

* * * * *